United States Patent
Ye et al.

(10) Patent No.: US 10,528,946 B2
(45) Date of Patent: Jan. 7, 2020

(54) SYSTEM AND METHOD FOR AUTHENTICATING, ASSOCIATING AND STORING SECURE INFORMATION

(71) Applicant: Tencent Technology (Shenzhen) Company Limited, Shenzhen (CN)

(72) Inventors: Wa Ye, Shenzhen (CN); Zhenyu Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 946 days.

(21) Appl. No.: 14/456,810

(22) Filed: Aug. 11, 2014

(65) Prior Publication Data

US 2015/0127539 A1    May 7, 2015

Related U.S. Application Data

(63) Continuation of application No. PCT/CN2014/078488, filed on May 27, 2014.

(30) Foreign Application Priority Data

Nov. 6, 2013  (CN) .......................... 2013 1 0548018

(51) Int. Cl.
    *G06Q 20/40*    (2012.01)
(52) U.S. Cl.
    CPC .................. *G06Q 20/401* (2013.01)
(58) Field of Classification Search
    CPC ...... G06F 17/30241; G06F 21/53; G06F 9/54; G06F 17/30887; G06Q 40/04;
    (Continued)

(56) References Cited

U.S. PATENT DOCUMENTS 5,708,422 A * 1/1998 Blonder ................. G06Q 20/40
                                                       340/5.41
8,571,983 B1   10/2013 Blackhurst et al.
(Continued)

FOREIGN PATENT DOCUMENTS

CN      101140672 A    3/2008
CN      101751627 A    6/2010
(Continued)

OTHER PUBLICATIONS

Tencent Technology, Written Opinion, PCT/CN2014/078488, dated Jul. 30, 2014, 4 pgs.
(Continued)

*Primary Examiner* — Johann Y Choo
(74) *Attorney, Agent, or Firm* — Morgan, Lewis & Bockius LLP

(57) ABSTRACT

The present application discloses a method for authorizing mobile payment from a mobile application installed on a mobile device. After a user logs into a user account at the mobile application, the mobile device receives user information, and obtains payment card information retrieved from a first image of a payment card captured by the mobile device. Then, a request is sent to a server for authorizing the user to make mobile payment using the mobile application. The server is configured to authenticate the request by communicating with a financial institution using the user information and the payment card information. The mobile device receives a confirmation message after the authentication of the user information and the payment card information by the financial institution, and displays the confirmation message to the user of the mobile device such that the user can make mobile payment via the user account at the mobile application.

20 Claims, 7 Drawing Sheets

(58) Field of Classification Search
CPC .... G06Q 50/01; G06Q 20/02; G06Q 30/0238; G06Q 20/3225; G06Q 20/34; G06Q 20/409; G06Q 20/123; G06Q 20/14; G06Q 20/385; G06Q 20/4016; G06Q 30/06; G06Q 20/322; G06Q 20/3276; G06Q 30/0635; G06Q 30/0265; G06Q 30/0603; G06Q 30/0241

See application file for complete search history.

(56) References Cited

U.S. PATENT DOCUMENTS

| | | | | |
|---|---|---|---|---|
| 2004/0030601 | A1* | 2/2004 | Pond | B67D 7/145 705/16 |
| 2005/0027648 | A1* | 2/2005 | Knowles | G06Q 20/04 705/38 |
| 2006/0129485 | A1* | 6/2006 | Hamzy | G06Q 20/102 705/40 |
| 2006/0206709 | A1* | 9/2006 | Labrou | G06Q 20/18 713/167 |
| 2009/0094458 | A1* | 4/2009 | Dionisio | G06Q 20/32 713/171 |
| 2010/0008535 | A1 | 1/2010 | Abulafia et al. | |
| 2012/0239542 | A1* | 9/2012 | Preston | G06Q 30/06 705/35 |
| 2013/0166638 | A1* | 6/2013 | Theado | G06Q 20/027 709/204 |
| 2013/0185207 | A1 | 7/2013 | Lyons et al. | |
| 2014/0058944 | A1* | 2/2014 | Ballout | G06Q 20/3223 705/43 |
| 2014/0143143 | A1* | 5/2014 | Fasoli | G06Q 20/023 705/44 |
| 2014/0279096 | A1* | 9/2014 | Akin | G06Q 20/401 705/16 |
| 2015/0088760 | A1* | 3/2015 | Meurs | G06Q 20/4012 705/72 |
| 2015/0181111 | A1* | 6/2015 | Stewart | H04N 5/23219 348/211.8 |
| 2015/0312038 | A1* | 10/2015 | Palanisamy | H04L 9/3213 713/155 |

FOREIGN PATENT DOCUMENTS

| | | |
|---|---|---|
| CN | 102004978 A | 4/2011 |
| CN | 102184499 A | 9/2011 |
| CN | 103186857 A | 7/2013 |
| CN | 103198405 A | 7/2013 |
| CN | 103295339 A | 9/2013 |
| TW | 201307615 A | 2/2013 |

OTHER PUBLICATIONS

Tencent Technology, IPRP, PCT/CN2014/078488, May 10, 2016, 5 pgs.

Tencent Technology, ISR, PCT/CN2014/078488, Jul. 30, 2014, 3 pgs.

* cited by examiner

A

At a server having one or more processors and memory for storing programs to be executed by the one or more processors:

Receiving a request from the mobile device for authorizing a user to make mobile payments using the mobile application, receiving the request further comprising: — S102B > Receiving user information, the user information including user account information at the mobile application and the user's personal information
>
> Receiving information of a payment card provided by the user, the payment card information being retrieved from a first image of the payment card captured by the mobile device Sending at least a part of the user information and at least a part of the payment card information to a corresponding financial institute for verification — S103

In accordance with a determination whether the user information and the payment card information are verified by the financial institute, authenticating the request for authorizing the user to make mobile payments using the mobile application — S104

↓ Y

Sending a confirmation message to the mobile device to acknowledge the authentication of the user information and the payment card information by the financial institution, the payment card information and the user information being associated and stored — S105

Bank card front 202

ID card front 204

200

SYSTEM AND METHOD FOR AUTHENTICATING, ASSOCIATING AND STORING SECURE INFORMATION

RELATED APPLICATIONS

This application is a continuation application of PCT Patent Application No. PCT/CN2014/078488, entitled "SYSTEM AND METHOD FOR AUTHENTICATING, ASSOCIATING AND STORING SECURE INFORMATION" filed on May 27, 2014, which claims priority to Chinese Patent Application No. 201310548018.0, entitled "System and Method for Associating Payment Cards with Users," filed on Nov. 6, 2013, both which are incorporated by reference in their entirety.

FIELD DISCLOSURE

The present application relates to the field of data communication technology, and in particular, to methods, systems and devices for authenticating, associating, and storing user information and payment card information for a user account of a mobile application installed on a mobile device.

BACKGROUND DISCLOSURE

Online payment technologies have been widely applied to allow customers to make payments using credit cards or bank cards on a third-party platform (e.g., an online shopping system). A customer registers a user account on the third-party platform, and this user account is often linked with one or more payment cards associated with the customer. When financial transactions are implemented on this third-party platform, online payment requests are made from this user account to a corresponding financial institution that issued one of the payment cards. When the financial institution authenticates information of the payment card and the customer, the corresponding financial transactions are approved, and the requested payments continue to be processed for this specific user account on the third-party platform. Given the wide application of such financial transactions these days, it is essential to establish a method to conveniently link a user account with one or more payment cards associated with a specific customer.

Typically, a customer has to manually enter information regarding his or her identification and payment cards. A respective financial institution verifies the received identification and payment card information with a record that was prepared when the corresponding payment card was issued to the customer. Upon a positive verification, the financial institution sends a confirmation notice to the third-party platform. Then, the user account is allowed to be linked with this specific payment card associated. However, the payment card information normally involves a long sequence of numbers, and it takes efforts to enter the payment card information correctly without any error. Entering the long sequence of numbers can impose more challenges, when more and more payment requests are made from mobile devices that have small touch keyboards, and inevitably slow down the linking process between the user account and the payment cards. Furthermore, the linking process could be further slowed down, when some financial institutions also require information on a user identification card for the purposes of verifying the payment card information. Therefore, there is a need to conveniently link a user account on a third-party platform with a payment card issued by a financial institution without compromising the security of the corresponding user information and payment card information.

SUMMARY

The above deficiencies and other problems associated with the conventional approaches of pushing webpage content to a web browser on a client device are reduced or eliminated by the disclosure disclosed below. In some embodiments, the disclosure is implemented in a server that has one or more processors, memory and one or more modules, programs or sets of instructions stored in the memory for performing multiple functions. Instructions for performing these functions may be included in a computer program product configured for execution by one or more processors.

One aspect of the disclosure is a method for authorizing mobile payment from a mobile application installed on a mobile device. The method includes, at the mobile device having one or more processors and memory for storing programs to be executed by the one or more processors and after a user logs into a user account at the mobile application, receiving user information that includes user account information at the mobile application and the user's personal information. The method further includes obtaining information of a payment card provided by the user, wherein the payment card information is retrieved from a first image of the payment card captured by the mobile device. The method further includes sending a request to a server for authorizing the user to make mobile payments using the mobile application, and the request includes the user information and the payment card information, wherein the server is configured to authenticate the request by communicating with a financial institution using the user information and the payment card information. The method further including receiving a confirmation message after the authentication of the user information and the payment card information by the financial institution, and displaying the confirmation message to the user of the mobile device such that the user can make mobile payments using the user account at the mobile application.

Another aspect of the disclosure is a mobile device that one or more processors and memory having instructions stored thereon, which when executed by the one or more processors cause the processors to perform operations to receive user information that includes user account information at the mobile application and the user's personal information. The processors in the mobile device further perform operations to obtain information of a payment card provided by the user, and the payment card information is retrieved from a first image of the payment card captured by the mobile device. The processors in the mobile device further perform operations to send a request to a server for authorizing the user to make mobile payments using the mobile application, wherein the request includes the user information and the payment card information and wherein the server is configured to authenticate the request by communicating with a financial institution using the user information and the payment card information. The processors in the mobile device further perform operations to receive a confirmation message after the authentication of the user information and the payment card information by the financial institution and display the confirmation message to the user of the mobile device such that the user can make mobile payments using the user account at the mobile application.

Another aspect of the disclosure is a method for authorizing mobile payment from a mobile application installed on a mobile device. The method includes, at a server having one or more processors and memory for storing programs to be executed by the one or more processors, receiving a request from the mobile device for authorizing a user to make mobile payments using the mobile application, wherein receiving the request further includes: receiving user information that includes user account information at the mobile application and the user's personal information, and receiving payment card information retrieved from a first image of the payment card captured by the mobile device. The method further includes: sending the user information and the payment card information to a corresponding financial institution for verification; in accordance with a determination whether the personal information and the payment card information are verified by the financial institution, authenticating the request for authorizing the user to make mobile payments using the mobile application; and sending a confirmation message to the mobile device to acknowledge the authentication of the personal information in the user information and the payment card information by the financial institution, wherein the payment card information and the user information are associated with the user account and stored.

Other embodiments and advantages may be apparent to those skilled in the art in light of the descriptions and drawings in this specification.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

FIG. 1C illustrates a flow chart for an exemplary mobile payment method that is implemented on a server according to some embodiments in the disclosure.

Like reference numerals refer to corresponding parts throughout the several views of the drawings.

DESCRIPTION OF EMBODIMENTS

Figure 1A:
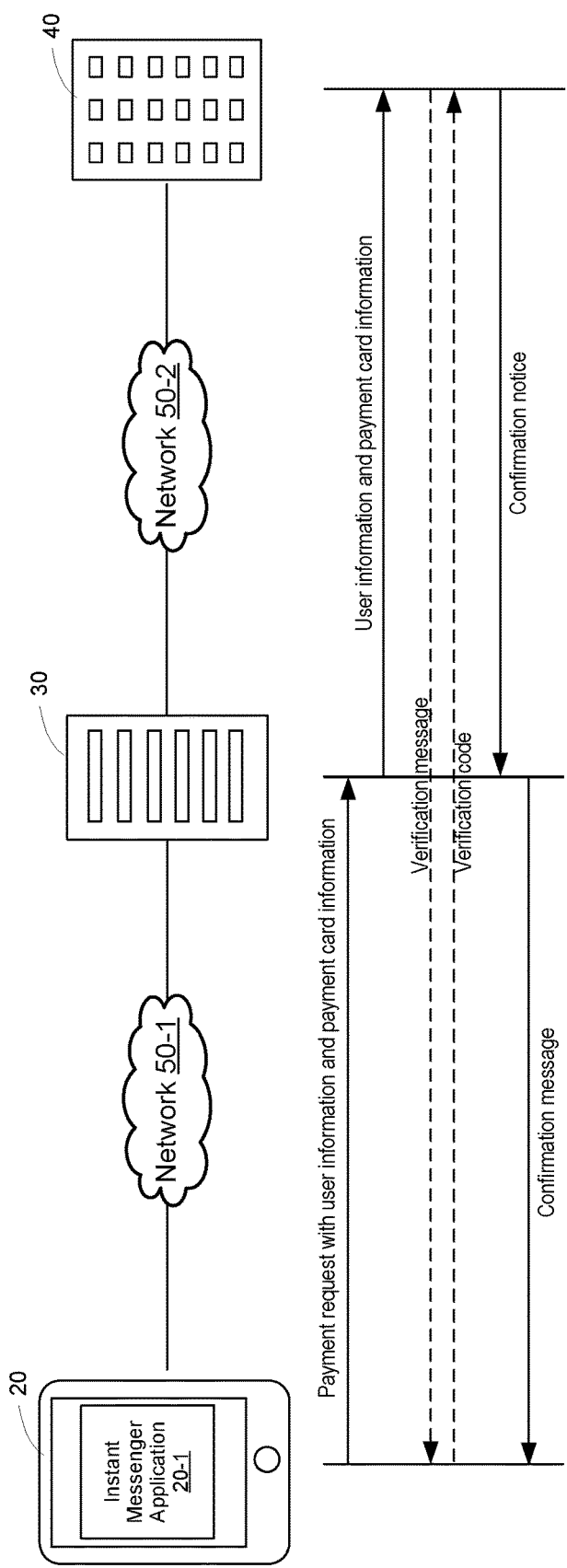
FIG. 1A illustrates an exemplary mobile payment process that involves a mobile device, a server and a financial institution according to some embodiments in the disclosure.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Description of each embodiment in the following is made with reference to the accompanying drawings, so as to exemplify specific embodiments capable of being implemented in the present application. Direction words mentioned in the present application, for example, "upper", "lower", "front", "back", "left", "right", "inner", "outer", and "side surface" only refer to directions of the accompanying drawings. Therefore, the used direction words are used to illustrate and understand the present application, instead of limiting the present application. In the drawings, units with a similar structure may be represented by the same numeral.

FIG. 1A illustrates an exemplary mobile payment process 10 that involves a mobile device 20, a server 30 and a financial institution 40 according to some embodiments in the disclosure. Mobile payment process 10 is implemented to authorize mobile payment that is requested from a mobile application such as an instant messenger application 20-1 (e.g., WeChat) installed on mobile device 20, and associate a user account of the mobile application with user information and payment card information. Mobile device 20 provides intermediate server 30 with the user information and the payment card information. During the course of authorization, financial institution 40 receives and authenticates the payment card information and personal information included in the user information from server 30. In accordance with the authentication by financial institution 40, intermediate server 30 receives a confirmation notice from financial institution 40 and determines whether to authorize mobile payment. Further in accordance with authorization of the mobile payment, intermediate server 30 returns a confirmation message to mobile device 20 to acknowledge authorization of the mobile payment, associates the user information and the payment card information for the corresponding use account of the mobile application, and stores the aforementioned information for the user account in a memory.

In some implementations, the mobile application is programmed as an application package file (APK) for operation on an Android operating system. In some implementations, the mobile application is programmed as a mobile application on an Apple iOS. In some implementations, the mobile application is associated with an online store, such as Amazon.com. However, in some implementation, the mobile application is a software program that is mainly designed for other functions but sometimes directed for a payment function. Examples of such a mobile application include, but are not limited to, an Internet web browser and a live instant messenger (e.g., WeChat). As a result of implementing mobile payment process 10, the user information and the payment card information are also conveniently associated with each other for the corresponding user account in this mobile application.

In some implementations, the payment card information is recorded in an image of a payment card and extracted automatically by the mobile application or another information extraction application. Similarly, under some circumstances, when a user identification (ID) card is used to provide user identification information as a part of the user information, the corresponding user information is optionally extracted from an image of the user ID card. Such image-based information extraction allows mobile payment process 10 to be implemented conveniently and accurately without any concerns with human errors associated with manual input.

Mobile device 20, server 30 and financial institution 40 (e.g., a bank server) are communicatively coupled to each other via communication networks 50-1 and 50-2. Communication network(s) 50-1 and 50-2 can be one or more networks having one or more type of topologies, including but not limited to the Internet, intranets, local area networks (LANs), cellular networks, Ethernet, Storage Area Networks (SANs), telephone networks, Bluetooth personal area networks (PAN), Wi-Fi networks and the like.

Further, as confidential information (e.g., the payment card information and the user information) is communicated over communication networks 50-1 and 50-2, the respective information has to be encrypted for secure data transfer according to a predetermined security requirement. In one specific example, the payment card information is encrypted to meet Payment Card industry Data Security Standards (PCI DSS).

Figure 1B:
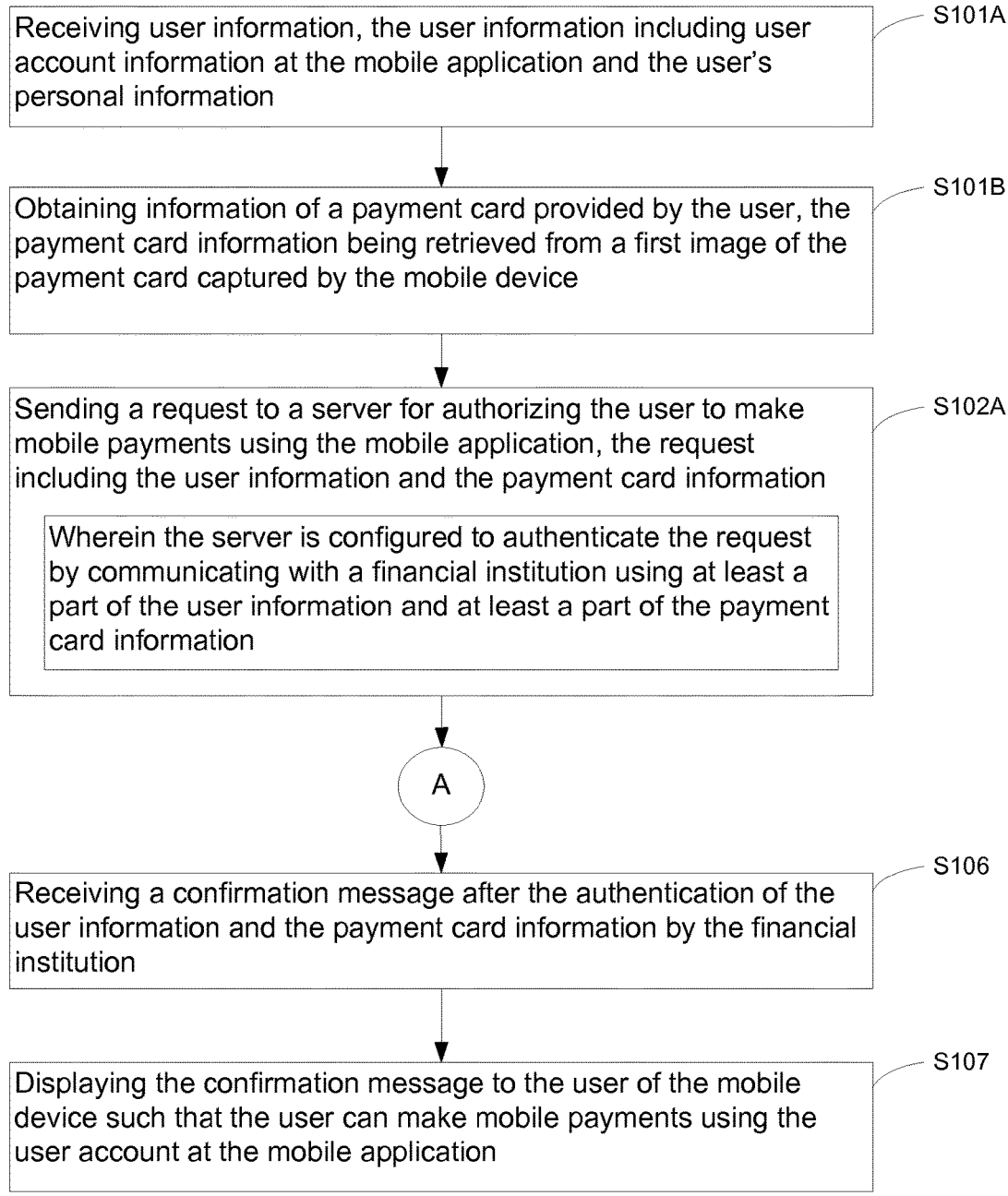
FIG. 1B illustrates a flow chart for an exemplary mobile payment method that is implemented to authorize mobile payment from a mobile application installed on a mobile device according to some embodiments in the disclosure.

FIG. 1B illustrates a flow chart 100 for an exemplary mobile payment method that is implemented to authorize mobile payment from a mobile application installed on mobile device 20 according to some embodiments in the disclosure. Method 100 is, optionally, governed by instructions that are stored in a non-transitory computer readable storage medium and that are executed by one or more processors of a computational machine (e.g., a mobile device). Each of the operations shown in FIG. 1B may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

In some implementations, method 100 is performed by a mobile device that has one or more processors and memory for storing programs to be executed by the one or more processors, and particularly, performed after a user logs into a user account at the mobile application that is installed on mobile device 20. The mobile application receives (S101A) user information of a user, and the user information includes user account information and the user's personal information. The user account information is associated with the user account of the mobile application, and stored in a database maintained in server 30 that supports financial transactions via a user interface based on the mobile application. When the user logs into the user account on the mobile application using the user account information, server 30 verifies the user based on the user account information stored in its database.

On the other hand, the user's personal information is independent of the user account on the mobile application, and is provided to a financial institution that issues the payment card to verify the identity of the user (or a cardholder). Examples of the user's personal information include a phone number, a quick response (QR) code and an instant messenger (e.g., WeChat) account identification associated with the user. Further, in one specific example, the personal information is the identification number printed on a government-issued user identification card, such as a driver license, a national identification (ID) card and a passport. In another specific example, the user's personal information includes a phone number that is manually inputted via a keyboard or automatically retrieved from local setting information of mobile device 20. The retrieved phone number is used by the mobile application to verify whether this phone number is consistent with the phone number previously provided to financial institution 40 by the user.

The mobile application also obtains (S101B) information of a payment card provided by the user, and the payment card information is retrieved from a first image of the payment card captured by mobile device 20. In some embodiments, the first image of the payment card is captured using a built-in camera installed on mobile device 20. For the purpose of improving the image quality, the first image is further processed by at least one operation of adjusting a tilting angle of the first image and cropping the first image to remove redundant space around the payment card information captured on the first image. The payment card information is further recognized from the processed first image.

Optionally, the first image is captured during the course of processing the mobile payment. Optionally, the first image was previously captured but stored in an image database of mobile device 20. In some implementations, processing and/or recognition of the captured first image is implemented in mobile device 20 using the mobile application or another specialized information extraction application; in other implementations, the first image is securely transferred to another recognition server that completes processing and/or recognition of the captured first image for mobile device 20.

Under some circumstances, the user's personal information includes user identification information printed on a user ID card of the user, and the user identification information is used as a part of the user information that needs to be authenticated. In some implementations, the user identification information is also retrieved from the first image captured by mobile device 20. In particular, the user ID card and the payment card of the user are arranged side by side, such that their front sides are both captured in the same first image. In some implementations, the user identification information on the user ID card is retrieved from a second image that is distinct from the first image and captured separately by mobile device 20.

In some situations, retrieval of the respective information of the payment card information and the user identification information involves both mobile device 20 and another recognition server. During the course of information retrieval, a respective image of the payment card and the identification card is captured using a built-in camera installed on mobile device 20. The respective image is optionally processed in mobile device 20, and then sent to the recognition server. The recognition server further processes the respective image and recognizes the respective information on the user ID card or the payment card based on the respective image. Mobile device 20 receives the respective information of the payment card information and the user identification information from the recognition server.

In some embodiments, the recognition server is the same server as server 30 that is configured to authenticate the mobile payment request. However, in some embodiments, the recognition server is a distinct server that operates based on cloud computing technology.

After collecting both the user information and the payment card information, mobile device 20 sends (S102A) a request to server 30 for authorizing the user to make mobile payments using the mobile application. The request includes the user information and the payment card information. In addition, server 30 is configured to authenticate the request by communicating with financial institution 40 using at least a part of the user information (e.g., the personal information) and at least a part of the payment card information. In a specific example, server 30 allows a user to buy gift cards as birthday gifts via mobile application WeChat, and therefore, can process the user' payment requests to pay for the gift cards by communicating with a financial institution, e.g., Bank of America, that issued a payment card to the user.

In some embodiments, in accordance with the authentication of the user information and the payment card information by financial institution 40, a confirmation notice is sent from financial institution 40 to server 30. Further in accordance with this confirmation notice, server 30 associates the user account with the payment card information and the user information, and stores both the payment card information and the user information in a memory, and further issues a confirmation message to mobile device 20.

The mobile application receives (S106) the confirmation message after the authentication of the user information and the payment card information by financial institution 40, and further displays (S107) the confirmation message to the user of mobile device 20 such that the user can make mobile payments using the user account at the mobile application.

In some implementations, when server 30 communicates with financial institution 40 for the purpose of authenticating the payment request, financial institution 40 issues a verification message that includes a verification code. Mobile device 20 receives the verification message directly from financial institution 40 and returns the verification code that is included in the verification message to financial institution 40. In accordance with a determination that the returned verification code is consistent with the original verification code in the issued verification message, financial institution 40 authenticates the user information and the payment card information.

In some situations, a message box in mobile device 20 is monitored to detect whether a verification message is received from financial institution 40. In accordance with a detection that the verification message is delivered to the message box, the verification code is read from the verification message and entered into the mobile application. In some implementations, this process of extracting the verification code is automatically implemented, and therefore, the user merely needs to visually check the validity of the verification code entered into the mobile application and click on a "submission" button. Therefore, the verification code may be returned to financial institution 40 for verification by financial institution 40.

It should be understood that the particular order in which the operations in FIG. 1A have been described are merely exemplary and are not intended to indicate that the described order is the only order in which the operations could be performed. One of ordinary skill in the art would recognize various ways to make payments via a mobile application on a mobile device and associate payment card information with user information as described herein. Additionally, it should be noted that details of other methods described with respect to method 150 (e.g., FIG. 1C) are also applicable in an analogous manner to method 100 described above with respect to FIG. 1B. For brevity, these details are not repeated here.

FIG. 1C illustrates a flow chart for an exemplary mobile payment method 150 that is implemented on server 30 according to some embodiments in the disclosure. Method 150 is, optionally, governed by instructions that are stored in a non-transitory computer readable storage medium and that are executed by one or more processors of a computational machine (e.g., a server used to manage mobile payment). Each of the operations shown in FIG. 1C may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 150 may be combined and/or the order of some operations may be changed.

In some implementations, method 150 is performed by a server that has one or more processors and memory for storing programs to be executed by the one or more processors. After mobile device 20 sends (S102A) the request for authorizing the user to make mobile payments using the mobile application, server 30 receives (S102B) the request from mobile device 20 for authorizing the user to make mobile payments using the mobile application. In particular, receiving the request further comprises: receiving user information that includes the user account information at the mobile application and the user's personal information, and receiving information of the payment card provided by the user. The payment card information is retrieved from the first image of the payment card captured by mobile device 20.

Then, server 30 sends (S103) at least a part of the user information (e.g., the personal information) and at least a part of the payment card information to the corresponding financial institution 40 for verification. In some embodiments, financial institution 40 requires the account number and the expiration date of the payment card, the user identification information on the user ID card (e.g., a driver license), and a phone number of the user for the purposes of verification.

In accordance with a determination that the user information and the payment card information are verified by financial institution 40, server 30 authenticates (S104) the request for authorizing the user to make mobile payments using the mobile application. In some embodiments, in accordance with the authentication of the user information and the payment card information by financial institution 40, a confirmation notice is sent from financial institution 40 to server 30. Further in accordance with the confirmation notice, server 30 associates the user account with the payment card information and the user information. As a result of association, the payment card information is linked with the user information for the user account.

After determining that the user information and the payment card information are verified by financial institution 40, server 30 then sends (S105) a confirmation message to mobile device 20 to acknowledge the authentication of the user information and the payment card information by financial institution 40. Moreover, the payment card information and the user information are further associated and stored together for the corresponding user account by server 30. In some embodiments, the user information and the payment card information are stored in a memory of server 30. In some embodiments, the user information and the payment card information are stored in another memory of a third-party server that is managed separately by a specialized secure data storage service.

In some implementations, server 30 determines whether financial institution 40 indicated by the payment card information is a legitimate entity that has been registered with server 30. In accordance with the determination that financial institution 40 is not a legitimate entity registered with server 30, server 30 invalidates the confirmation message. In some embodiments, mobile device 20 displays another invalidation message to indicate that the payment card information is not authenticated.

Under some circumstances, additional mobile payment requests are subsequently received from the user account associated with the mobile application on the specific mobile device. Mobile device 20 does not need to collect the payment card information and/or the user information (e.g., the user ID number on the national ID card) again, because the user account has already been associated with the payment card information and the user information. In some implementations, as long as the user has logged into the user account successfully, additional mobile payment is made directly using the associated payment card information. In some implementations, another payment password is set up, when the user account is first associated with the payment card information and the user information, and the user has to input the payment password correctly in order to use the payment card to make additional mobile payment. Therefore, subsequent mobile payment processes do not repeat verification of the user information and the payment card information, and can be expedited without compromising the authentication requirements.

In some implementations, the user account is associated with more than one payment cards. For the user account, the user information and the payment card information for the more than one payment cards are stored in server 30 or the other third-party server that specialized in data storage and management.

It should be understood that the particular order in which the operations in FIG. 1B have been described are merely exemplary and are not intended to indicate that the described order is the only order in which the operations could be performed. One of ordinary skill in the art would recognize various ways to process payment requests from a mobile device and associate payment card information with user information as described herein. Additionally, it should be noted that details of other methods described with respect to method 100 (e.g., FIG. 1B) are also applicable in an analogous manner to method 150 described above with respect to FIG. 1C. For brevity, these details are not repeated here.

Figure 2:
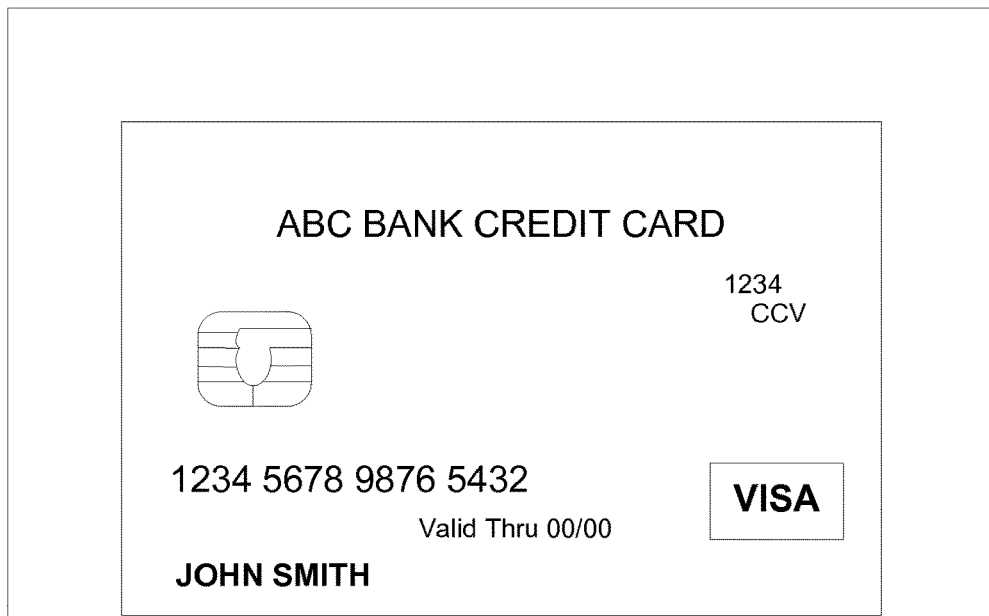
FIG. 2 illustrates an exemplary image that includes a front side of a payment card (e.g., a debit card and a credit card) and a front side of a user ID card (e.g., a driver license) according to some embodiments in the disclosure.
Figure 2:
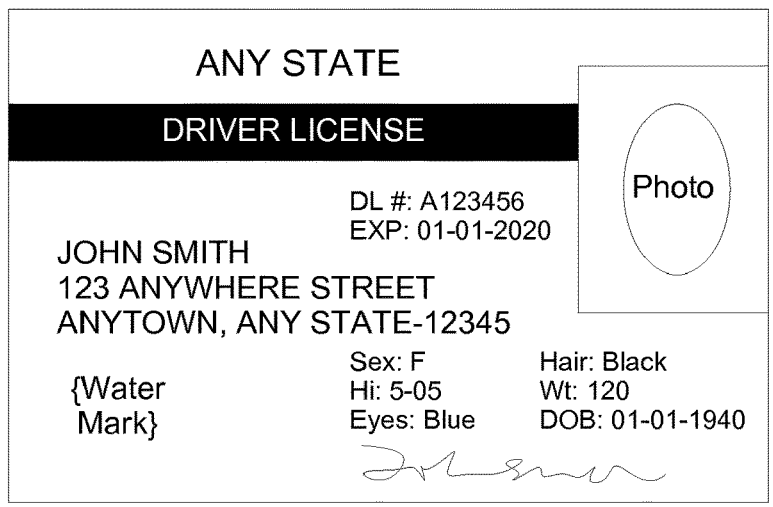

FIG. 2 illustrates an exemplary image 200 that includes a front side 202 of a payment card (e.g., a debit card or a credit card) and a front side 204 of a user ID card (e.g., a driver license) according to some embodiments in the disclosure. The user ID card is used to provide user identification information that financial institution 40 uses to authenticate user payment information. In some implementations, financial institution 40 requires that the user identification information be verified for every payment request. In this embodiment shown in FIG. 2 the front sides of both the payment card and the user ID card are captured in the same image. However, in some embodiments, the front sides of these two cards are captured separately in two images.

The respective front side of the payment card and the user ID card contains the corresponding payment card information or the user identification information. As shown in FIG. 2, in some embodiments, the payment card information includes a representation of financial institution 40 (e.g., "ABC Bank"), a card type (e.g., "Visa"), an account number of the user account, a print name of the user, an expiration date, and a card verification value (CVV) that are associated with the payment card. In some embodiments, the user's identification information printed on the user ID card includes a given name, a family name, an identification number (e.g., "DL #"), a home address, sex, height, eye color, hair color, weight, date of birth, a signature, and a photo of the user.

Figure 3:
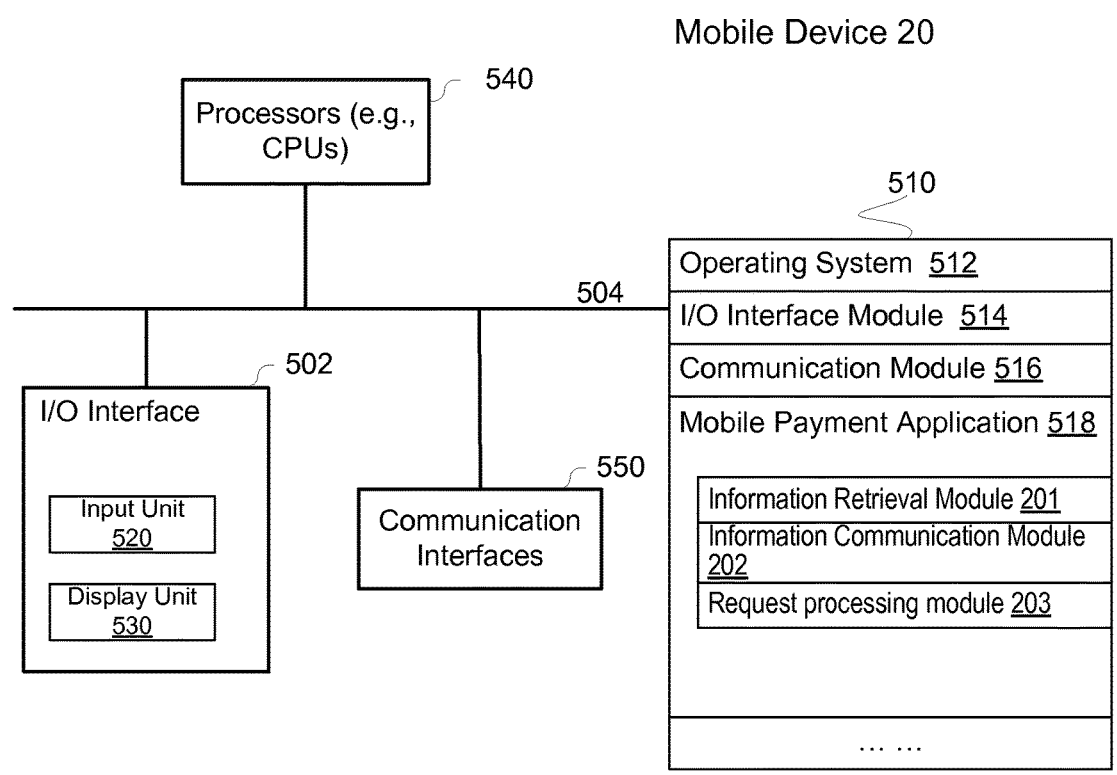
FIG. 3 illustrates a block diagram of an exemplary mobile device that is used for making mobile payment according to some embodiments in the disclosure.

FIG. 3 illustrates a block diagram of an exemplary mobile device 20 that is used for making mobile payment according to some embodiments in the disclosure. In accordance with various embodiments of the disclosure, mobile device 20 is applied to authorize mobile payment made from a mobile application as shown in FIGS. 1A-1C. In some implementations, mobile device 20 at least includes one or more processors 540 (e.g., central processing units) and a memory 510 for storing data, programs and instructions for execution by one or more processors 540. In some implementations, mobile device 20 further includes one or more communication interfaces 550, a user interface 502, and one or more communication buses 504 that interconnect these components.

In some embodiments, input/output (I/O) interface 502 includes an input unit 520 and a display unit 530. Examples of input unit 520 include a keyboard, a mouse, a touch pad, a game controller, a microphone and a camera. The user enters number, letter, user identification information, payment card information or other information via input unit 520. In one specific example, the user enters his or her phone number on the keyboard for authentication with respect to another phone number that was previously provided to financial institution 40. In some implementations, the images of a user ID card or a payment card are captured by the camera.

Additionally, display unit 530 displays information that is inputted by the user or provided to the user for review. Examples of display unit 530 include, but are not limited to, a liquid crystal display (LCD) and an organic light-emitting diode (OLED) display. In various embodiments of the present application, the user information and the payment card information are displayed on display unit 530, such that the user may review the information and control the mobile payment process.

In some embodiments, communication buses 504 include circuitry (sometimes called a chipset) that interconnects and controls communications between system components. In some embodiments, memory 510 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 510 includes one or more storage devices remotely located from the one or more processors 540. In some embodiments, memory 510, or alternatively the non-volatile memory device(s) within memory 510, includes a non-transitory computer readable storage medium.

In some embodiments, memory 510 or alternatively the non-transitory computer readable storage medium of memory 510 stores the following programs, modules and data structures, instructions, or a subset thereof:
  Operating System 512 that includes procedures for handling various basic system services and for performing hardware dependent tasks;

I/O interface module 514 that includes procedures for handling various basic input and output functions through one or more input and output devices;

Communication module 516 that is used for connecting mobile device 20 to other mobile devices 20, server 30 or financial institution 40, via one or more network communication interfaces 550 (wired or wireless) and one or more communication networks 50-1 and 50-2, such as the Internet, other wide area networks, local area networks, metropolitan area networks, and so on; and Mobile application 518 that implements mobile payment method 100 to authorize mobile payment according user information and payment card information of a user who logs into a user account associated with mobile application 518.

In some implementations, mobile application 518 further comprises an information retrieval module 201, an information communication module 202, and a request processing module 203. Information retrieval module 201 obtains the payment card information by retrieving it from a first image of a corresponding payment card captured by mobile device 20. In some embodiments, the user information includes user identification information that is printed on a user ID card, and the user identification information is optionally retrieved from an image of the user ID card by information retrieval module 201. In some embodiments, information retrieval module 201 retrieves the respective information of the payment card information and the user identification information locally; however, in some embodiments, information retrieval module 201 communicates the corresponding image(s) of the respective information to a remote recognition server that completes at least a part of the corresponding image retrieval operations. More detail on operations of obtaining the payment card information by image based information retrieval are explained above with reference to FIG. 1B. For brevity, these details are not repeated here.

Information communication module 202 receives and/or sends relevant information used by mobile application 518. In some implementations, information communication module 202 receives some user information (such as the user account information), and sends a mobile payment request to server 30 for authorizing the user to make payment using mobile application 518. Further, in accordance with authentication of the user information and the payment card information by financial institution 40, information communication module 202 receives a confirmation message from server 30.

Request processing module 203 generates the aforementioned mobile payment request for authorizing the user to make mobile payment using mobile application 518. In accordance with receiving the confirmation message corresponding to the mobile payment request, request processing module 203 completes the requested payment by additional operations, such as authorizing a corresponding purchase and printing a receipt. For brevity, details concerning authorizing the mobile payment are not repeated here.

Figure 4:
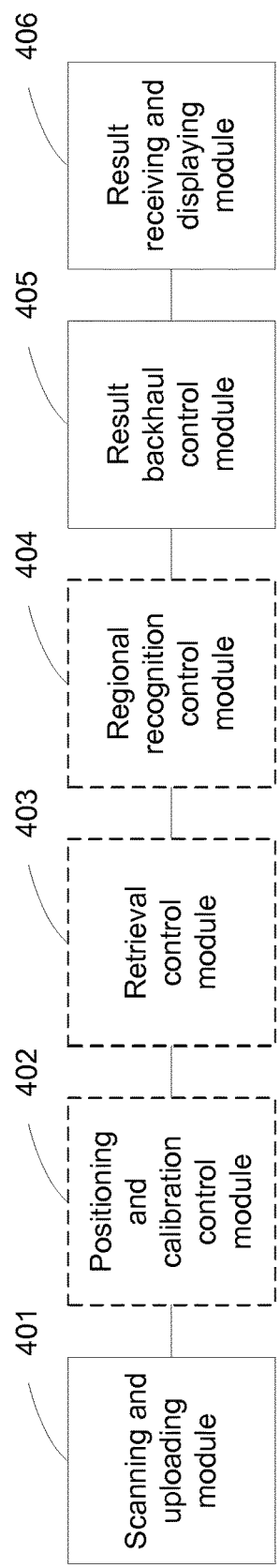
FIG. 4 illustrates a block diagram of an exemplary information retrieval module in a mobile application installed on a mobile device according to some embodiments in the disclosure.

FIG. 4 illustrates a block diagram of an exemplary information retrieval module 201 in mobile application 518 installed on mobile device 20 according to some embodiments in the disclosure. As explained above with reference to FIG. 3, information retrieval module 201 generally retrieves relevant information (e.g., user identification information and payment card information) from an image captured for a corresponding card (e.g., user ID card 204 and a payment card 202) that carries the relevant information. Information retrieval module 201 further includes some or all of a scanning and uploading module 401, a positioning and calibration control module 402, a retrieval control module 403, a regional recognition control module 404, a result backhaul control module 405, and a result receiving and displaying module 406.

Scanning and uploading module 401 controls a built-in camera in mobile device 20 to capture an image of the corresponding card. In some embodiments, more than one cards are captured in one captured image. Positioning and calibration control module 402 processes the captured image by at least one operation of adjusting a tilting angle of the captured image and cropping the first image to remove redundant space on the captured image. Then, retrieval control module 403 identifies a card type (e.g., a debit card, a membership card, a national ID card and a business card) for the corresponding card based on features recognized from the processed image. In some embodiments, retrieval control module 403 determines the card type by comparing the recognized features to images in a card database, and may accurately associate the card type with a specific financial institution that issues the card.

In accordance with the identified card type, regional recognition control module 404 further extracts the relevant information from the processed image. In a specific example, when retrieval control module 403 determines that the payment card is a debit card issued by Bank of America, regional recognition control module 404 further locates a 16-bit card number on the front side of the payment card with a location accuracy of 2-3 mm. Regional recognition control module 404 then recognizes each digit in the 16-bit card number according to a predetermined image recognition technique. Result receiving and displaying module 406 receives the extracted relevant information and displays it on a user interface of mobile application 518.

In some implementations, all image retrieval operations are implemented locally on mobile device 20, and therefore, modules 401-404 and 406 are located locally on mobile device 20. In some implementations, information retrieval module 201 refers to another independent information extraction application installed in mobile device 20, and functions of modules 401-404 and 406 are included in the information extraction application. However, in some other implementations, most image retrieval operations are implemented on a recognition server. The captured image is uploaded to the recognition server by scanning and uploading module 401, and the resulting relevant information is downloaded back to mobile device 20 by result backhaul control module 405. Thus, modules 401, 405 and 406 in information retrieval module 201 are included locally on mobile device 20, while modules 402-404 are optionally located on the recognition server.

Figure 5:
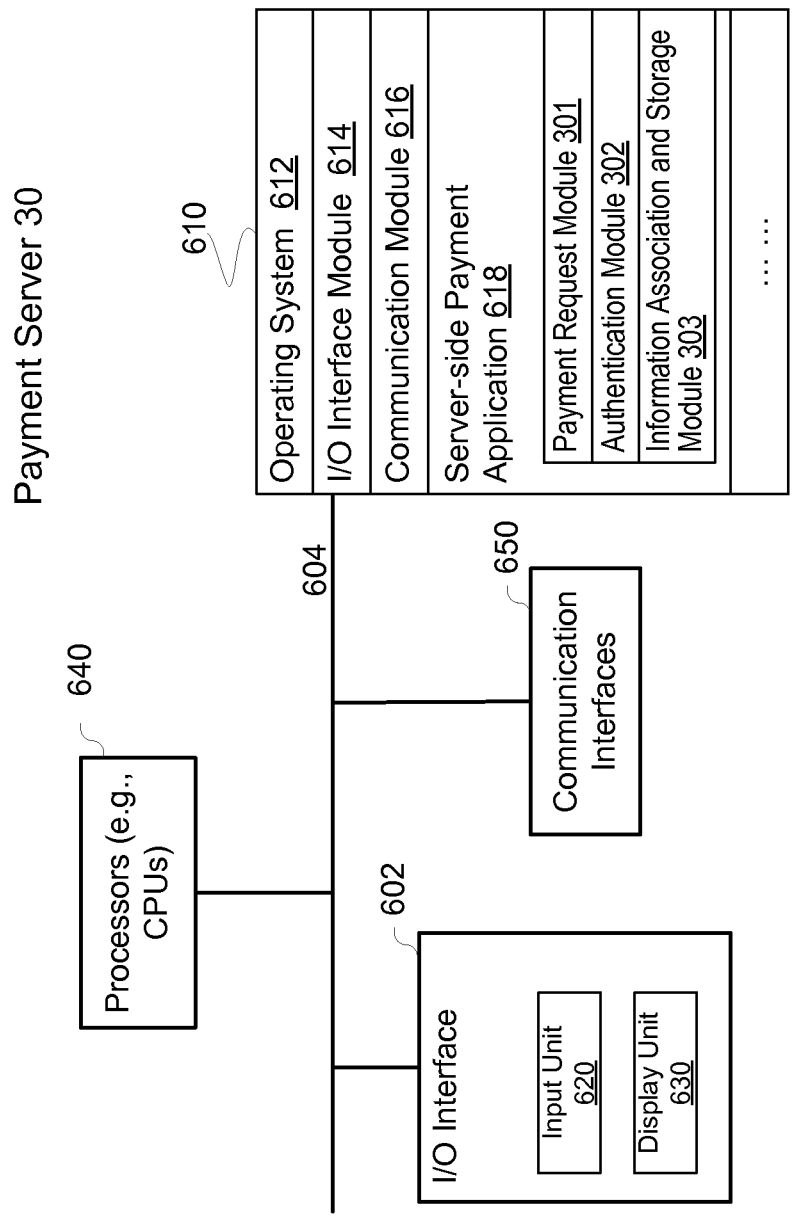
FIG. 5 illustrates a block diagram of an exemplary server that is used for authorizing mobile payment according to some embodiments in the disclosure.

FIG. 5 illustrates a block diagram of an exemplary server 30 that is used for authorizing mobile payment according to some embodiments in the disclosure. In accordance with various embodiments of the disclosure, server 30 is applied to authorize mobile payment made from a mobile application as shown in FIGS. 1A-1C. In some implementations, server 30 at least includes one or more processors 640 (e.g., central processing units) and a memory 610 for storing data programs and instructions for execution by one or more processors 640. In some implementations, the user information and the payment card information are stored in memory 610 in server 30. In some implementations, server 30 further includes one or more communication interfaces 650, an I/O interface 602, and one or more communication buses 604 that interconnect these components.

In some embodiments, input/output (I/O) interface 602 includes a display unit 630 and an input unit 620 such as a keyboard, a mouse or a touch pad. In some embodiments, communication buses 604 include circuitry (sometimes called a chipset) that interconnects and controls communications between system components. In some embodiments, memory 610 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 610 includes one or more storage devices remotely located from the one or more processors 640. In some embodiments, memory 610, or alternatively the non-volatile memory device(s) within memory 610, includes a non-transitory computer readable storage medium.

In some embodiments, memory 610 or alternatively the non-transitory computer readable storage medium of memory 610 stores the following programs, modules and data structures, instructions, or a subset thereof:

- Operating System 612 that includes procedures for handling various basic system services and for performing hardware dependent tasks;
- I/O interface module 614 that includes procedures for handling various basic input and output functions through one or more input and output devices;
- Communication module 616 that is used for connecting server 30 to other mobile device 20, server 30 or financial institution 40, via one or more network communication interfaces 650 (wired or wireless) and one or more communication networks 60, such as the Internet, other wide area networks, local area networks, metropolitan area networks, and so on; and
- Server-side mobile application 618 that implements mobile payment method 150 to authorize, associated and store mobile payment according to user information and payment card information for a user who logs into a user account associated with mobile application 518.

In some implementations, server-side mobile application 618 further includes a payment request module 301, an authentication module 302 and an information association and storage module 303. Payment request module 301 receives the payment request from mobile device 20, and sends at least a part of the received payment card information and the personal information included in the received user information to financial institution 40. In accordance with a confirmation notice received from financial institution 40 that confirms the personal information and the payment card information, authentication module 302 authenticates the payment card information and the user information including the personal information, and thereby authorizes mobile payment requested by mobile device 20. In particular, authentication module 302 generates and sends a confirmation message to mobile device 10 to acknowledge the authentication. Additionally, in accordance with a confirmation notice received from financial institution 40, information association and storage module 303 associates the user account with the payment card information and the user information that includes both the user account information and the user's personal information. More details on authorizing mobile payment on server 30 are explained above with reference to FIG. 1C.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the disclosure herein is for the purpose of describing particular embodiments only and is not intended to be limiting of the disclosure. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method for authorizing mobile payment from an instant messenger application installed on a mobile device, comprising:
    at the mobile device having one or more processors and memory for storing programs to be executed by the one or more processors:

after logging into a user's account at the instant messenger application:
- receiving, by the instant messenger application, user information including user account information at the instant messenger application and the user's personal information, wherein the instant messenger application has a primary function distinct from a payment function, and the user's personal information is used by a financial institution to verify an identity of the user and is independent of the user account information at the instant messenger application, further including automatically retrieving a phone number of the mobile device from local setting information of the mobile phone;
- obtaining, by the instant messenger application, information of a payment card provided by the user, the payment card information being retrieved from a first image of the payment card captured by the mobile device;
- sending, by the instant messenger application, a request to a server for authorizing the user to make mobile payments using the instant messenger application, the request including the user information and the payment card information, wherein the server is configured to authenticate the request by communicating with the financial institution using the phone number of the mobile device, at least a part of the user information and at least a part of the payment card information;
- receiving, by a message box application of the mobile device that is distinct from the instant messenger application, a verification message directly from the financial institution, the verification message including a verification code;
- extracting, by the instant messenger application, the verification code from the verification message;
- in response to a user action, returning, by the instant messenger application, the verification code extracted from the verification message to the financial institution, wherein the financial institution is configured to authenticate the user information and the payment card information in accordance with a determination whether the returned verification code is consistent with the verification code in the verification message;
- receiving, by the instant messenger application, a confirmation message in accordance with a result of the authentication of the user information and the payment card information by the financial institution;
- in accordance with the confirmation message, associating, by the instant messenger application, the user's account of the instant messenger application with the user information and the payment card information;
- displaying, by the instant messenger application, the confirmation message to the user of the mobile device such that the user can make mobile payments using the user's account at the instant messenger application;
- in accordance with the association of the user's account of the instant messenger application with the user information and the payment card information, setting up, by the instant messenger application, a payment password associated with the payment card information for the user's account;
- receiving, by the instant messenger application, a mobile payment request and the payment password from the user's account at the instant messenger application; and
- in accordance with a verification of the payment password, authorizing, by the instant messenger application, a mobile payment using the payment card information without entering and verifying the user information and the payment card information.

2. The method of claim 1, wherein the user's personal information further comprises user identification information printed on a user identification (ID) card of the user, and the user identification information on the user ID card is retrieved from a second image that is distinct from the first image and is also captured by the mobile device.

3. The method of claim 2, wherein the respective information of the payment card information and the user identification information is retrieved by:
- capturing a respective image of the payment card or the user ID card using a built-in camera installed on the mobile device;
- sending the respective image to a recognition server that further processes the respective image and recognizes the respective information on the user ID card or the payment card based on the respective image; and
- receiving the respective information from the recognition server.

4. The method of claim 3, wherein the recognition server is the same server as the server that is configured to authenticate the mobile payment request.

5. The method of claim 1, wherein the payment card information is selected from a representation of the financial institution, a card type, an account number of the user's account, a print name of the user, an expiration date, and a card verification value (CVV) that are associated with the payment card.

6. The method of claim 1, wherein the user's personal information further comprises user identification information printed on a user identification card of the user, and the user identification information comprises a given name, a family name, and a national identification number of the user.

7. The method of claim 1, further comprising:
- providing the retrieved phone number to the instant messenger application to verify whether the retrieved phone number is consistent with the phone number previously provided to the financial institution by the user.

8. The method of claim 1, wherein extracting the verification code from the verification message further comprises:
- monitoring the short message box application to detect that the verification message is received from the financial institution; and
- in accordance with the detection of the verification message in the short message box application, automatically identifying the verification code in the verification message and entering the message code into the instant message application.

9. The method of claim 8, wherein the short message box application in the mobile device is monitored, and in accordance with a detection that the verification message is delivered to the short message box application, the verification code is read from the verification message and entered into the instant messenger application, such that it is returned to the financial institution for verification by the financial institution.

10. The method of claim 1, wherein the server receives the payment card information and the user information from the mobile device, and determines whether the financial institution indicated by the payment card information is an entity that has been registered with the server; and wherein in accordance with a determination that the financial institution is not an entity registered with the server, sending the confirmation message to indicate that the financial institution is not an entity that has been registered with the server.

11. A mobile device for processing payment card information in an instant messenger application, comprising:

one or more processors; and memory having instructions stored thereon, which when executed by the one or more processors cause the processors to perform operations, comprising:

after logging into a user's account at the instant messenger application:

receiving, by the instant messenger application, user information including user account information at the instant messenger application and the user's personal information, wherein the instant messenger application has a primary function distinct from a payment function, and the user's personal information is used by a financial institution to verify an identity of the user and is independent of the user account information at the instant messenger application, further including automatically retrieving a phone number of the mobile device from local setting information of the mobile phone;

obtaining, by the instant messenger application, information of a payment card provided by the user, the payment card information being retrieved from a first image of the payment card captured by the mobile device;

sending, by the instant messenger application, a request to a server for authorizing the user to make mobile payments using the instant messenger application, the request including the user information and the payment card information, wherein the server is configured to authenticate the request by communicating with the financial institution using the phone number of the mobile device, at least a part of the user information and at least a part of the payment card information;

receiving, by a message box application of the mobile device that is distinct from the instant messenger application, a verification message directly from the financial institution, the verification message including a verification code;

extracting, by the instant messenger application, the verification code from the verification message;

in response to a user action, returning, by the instant messenger application, the verification code extracted from the verification message to the financial institution, wherein the financial institution is configured to authenticate the user information and the payment card information in accordance with a determination whether the returned verification code is consistent with the verification code in the verification message;

receiving, by the instant messenger application, a confirmation message in accordance with a result of the authentication of the user information and the payment card information by the financial institution;

in accordance with the confirmation message, associating, by the instant messenger application, the user's account of the instant messenger application with the user information and the payment card information;

displaying, by the instant messenger application, the confirmation message to the user of the mobile device such that the user can make mobile payments using the user's account at the instant messenger application;

in accordance with the association of the user's account of the instant messenger application with the user information and the payment card information, setting up, at the instant messenger application, a payment password associated with the payment card information for the user's account;

receiving, by the instant messenger application, a mobile payment request and the payment password from the user's account at the instant messenger application; and in accordance with a verification of the payment password, authorizing, by the instant messenger application, a mobile payment using the payment card information without entering and verifying the user information and the payment card information.

12. The mobile device of claim 11, the user's personal information includes at least one of a quick response (QR) code and an instant messenger account identification of an instant messenger application.

13. The mobile device of claim 11, wherein the user's personal information further comprises user identification information printed on a user identification (ID) card of the user, the user identification information being also retrieved from the first image captured by the mobile device, the user ID card and the payment card being arranged side by side and shot in the first image.

14. The mobile device of claim 11, wherein obtaining the payment card information further comprises:

capturing the first image of the payment card using a built-in camera installed on the mobile device;

processing the first image by at least one operation of adjusting a tilting angle of the first image and cropping the first image to remove redundant space around the payment card information captured on the first image; and recognizing the payment card information from the processed first image.

15. The mobile device of claim 11, wherein in accordance with the authentication of the user information and the payment card information by the financial institution, a confirmation notice is sent from the financial institution to the server, and wherein in accordance with the confirmation notice, the server associates the user's account with the payment card information and the user information, stores both the payment card information and the user information, and issues the confirmation message to the mobile device.

16. The mobile device of claim 11, wherein the user information and the payment card information are stored in the server or a third-party server that is managed separately by a secure data storage service.

17. The mobile device of claim 11, wherein the user information and the payment card information are encrypted for secure data transfer among the mobile device, the server and the financial institution according to Payment Card Industry Data Security Standards (PCI DSS).

18. A method for authorizing mobile payment from an instant messenger application installed on a mobile device, comprising:

at a server having one or more processors and memory for storing programs to be executed by the one or more processors:

after a user's account at the instant messenger application was logged in at the mobile phone:

receiving, from the instant messenger application, a request from the mobile device for authorizing a user to make mobile payments using the instant messenger application, wherein the instant messenger application has a primary function distinct from a payment function, receiving the request further comprising:

receiving user information, the user information including user account information at the instant messenger application and the user's personal information, wherein the user's personal information is used by a financial institution to verify an identity of the user and is independent of the user account information at the instant messenger application, further including receiving a phone number of the mobile device that is automatically retrieved from local setting information of the mobile phone;

receiving information of a payment card provided by the user, the payment card information being retrieved from a first image of the payment card captured by the mobile device;

sending the phone number of the mobile device, at least a part of the user information and at least a part of the payment card information to the financial institution for verification;

in response to a user action on the instant messenger application executed on the mobile device, receiving a verification code from the mobile device and forwarding the verification code to the financial institution, wherein the financial institution is configured to authenticate the user information and the payment card information in accordance with a determination whether the forwarded verification code is consistent with a verification code included in a verification message that has been sent directly to the mobile device by the financial institution;

in accordance with a determination whether the user information and the payment card information are verified by the financial institution, authenticating the request for authorizing the user to make mobile payments using the instant messenger application and associating the user's account of the instant messenger application with the user information and the payment card information;

sending a confirmation message to the mobile device to acknowledge the authentication of the user information and the payment card information by the financial institution, the payment card information and the user information being associated with the user account and stored together in the memory of the server;

in accordance with the association of the user's account of the instant messenger application with the user information and the payment card information at the financial institution, setting up a payment password associated with the payment card information for the user's account;

receiving a mobile payment request and the payment password from the user's account of the instant messenger application; and in accordance with a verification of the payment password, authorizing a mobile payment using the payment card information without entering and verifying the user information and the payment card information.

19. The method of claim 18, wherein the user's personal information further comprises user identification information printed on a user identification (ID) card of the user, the user ID card and the payment card being arranged side by side and shot in the first image, both the user identification information and the user identification information being retrieved from a first image captured by the mobile device.

20. The method of claim 18, wherein the mobile device obtains the payment card information by:

capturing the first image of the payment card using a built-in camera installed on the mobile device;

processing the first image by at least one operation of adjusting a tilting angle of the first image and cropping the first image to remove redundant space around the payment card information captured on the first image; and recognizing the payment card information from the processed first image.

* * * * *